United States Patent [19]
Richter et al.

[11] 3,744,278
[45] July 10, 1973

[54] LEATHER SHAVING MACHINE

[76] Inventors: Gerhard Richter, Weiherweg 13; Peter Poppel, Muhlhausener Str. 21, both of 84 Regensburg, Germany

[22] Filed: Sept. 27, 1971

[21] Appl. No.: 183,829

[30] Foreign Application Priority Data
Oct. 15, 1970 Germany.................. P 20 50 539.9

[52] U.S. Cl. .................................................. 69/42
[51] Int. Cl. ............................................. C14b 1/06
[58] Field of Search .................................. 69/42, 10; 100/162 B; 29/110, 113 AD, 116 R, 116 AD

[56] References Cited
UNITED STATES PATENTS
| | | | |
|---|---|---|---|
| 2,825,217 | 3/1958 | Byrd | 100/162 B UX |
| 2,897,538 | 8/1959 | Shapiro et al. | 100/162 B UX |
| 3,060,714 | 10/1962 | Weber | 69/10 |
| 3,116,627 | 1/1964 | Mani et al. | 69/42 |
| 3,168,435 | 2/1965 | Beachler | 100/162 B UX |

*Primary Examiner*—Alfred R. Guest
*Attorney*—Walter Spruegel

[57] ABSTRACT

Leather shaving machine, having companion shaving and counter rolls supported in bearings and tending to yield in operational bending deflection to leather passing between them, and hydraulically operated stress bearings for the rolls spaced from the support bearings and operable to apply to the rolls variable bending stresses to counter and cancel out operational bending deflection thereof.

3 Claims, 3 Drawing Figures

PATENTED JUL 10 1973 3,744,278
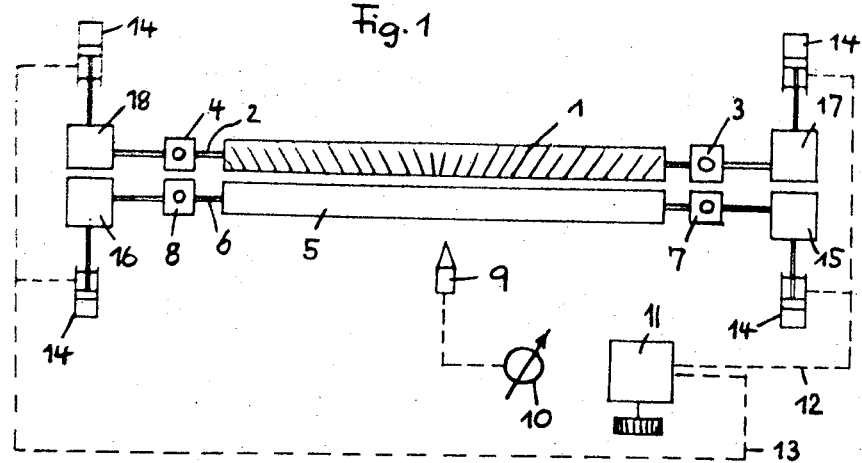
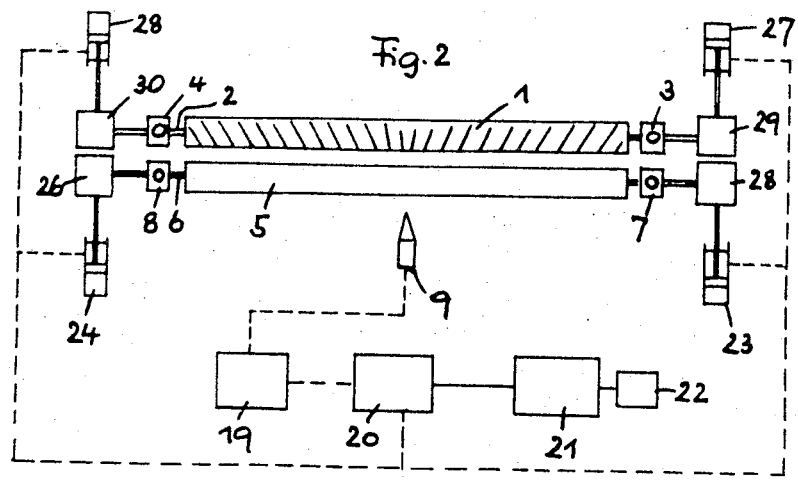
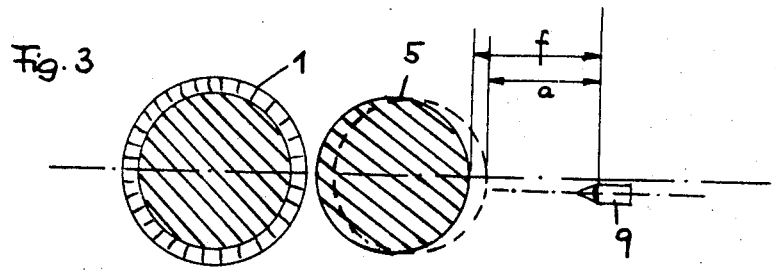
INVENTORS
Gerhard Richter
and Peter Pöppel
BY
Attorney

LEATHER SHAVING MACHINE

This invention relates to shaving machines for leather or like material, comprising a shaving roll and a counter roll, with the rolls being in operation forced against each other in order to counteract operational bending deflection of the rolls under a passing load.

Shaving machines of known types cope with operational deflection of the counter roll on passage of a skin to-be-treated, by constructing the counter roll as rigid and strong as possible which, however, not only involves considerable cost of the roll and its support, but fails to afford satisfactory results in the finished product or in the precision of its shaving. The considerable difficulties in this respect encountered in these shaving machines are due to the fact that the thickness and also the consistency of skins to-be-treated vary from skin to skin, and that even one and the same skin exhibits considerable differences in its thickness and consistency from one end to the other.

In the field of calenders for plastic sheeting, it is known to cope with operational deflection of the companion rolls on passage of such sheeting, by applying a counter stress to the bearing support. The magnitude of this counter stress can be determined and tabulated in a farily simple manner for sheeting of entirely equal and non-varying thickness, so that in producing sheeting of different thickness the corresponding magnitude of the stress to be applied can easily be determined. However, such fixed preadjustment of the stress is inadequate for the present purposes.

Accordingly, in order to obtain the required precision shaving of skins, it is necessary to provide in shaving machines of this type for varying the magnitude of the applied counter stress in accordance with sensed varying operational deflection of the counter roll in the course of the through-passage of a skin.

According to the invention, it is proposed to provide hydraulic stress bearings for applying the counter stress. To this end, a scanning device is arranged in relation to one roll, in this case the counter roll, in such manner that it indicates even the slightest deflection of this roll under load from its normal or idle position so that, dependent on this signal indication, the stress bearings can be operated. Preferably, the scanning device is coupled with the stress bearings in such manner that an operational deflection of the roll from its normal position, the tensioning bearings automatically apply counter-stress in accordance with the intensity of the signal.

In one particular embodiment of the invention, the scanning device is operatively associated with the stress bearings through a variable-gain amplifier and a pressure-regulating valve of a hydraulic power unit including a hydraulic cylinder.

The scanning device is preferably an optical device which in the idle position of the adjacent roll is focused on a predetermined point on the roll periphery. If the roll is under a load deflected from its idle position, so that the distance between both rolls increases and the roll facing the optical device is moved toward the latter, the distance between the optical device and the roll periphery is smaller than the focal length of the optical device so that a signal is generated or an optical indication is given.

Instead of using an optical device, a pneumatic device employing a flow medium or a mechanical device such as a caliper, can be used without departing from the scope of the invention.

The signal, which is preferably an electrical signal, though it may be an acoustic or an optical signal, can be perceived by an attendant, who manually, such as by a suitable servo control, operates the stress bearings hydraulically, whereby the extent of the operation is determined by empirical standards. However, such manual control, while extremely simple, does not afford a high degree of precision in controlling the counter stress.

On the other hand, fully automatic and accurate control of the counter stress, which meets all operational requirements, is obtained by supplying the electrical output signal of the preferred optical scanning device to a control amplifier, which amplifies the signal and supplies it to a pressure regulating member, which, in turn, controls the performance of hydraulic cylinders for adjusting the stress bearings. As long as the scanning device detects a deviation of the associated roll from its idle position, a corresponding counter stress is applied by the stress bearings which cancels the measured deviation. Thus, the greater the operational deflection of this associated roll will be, the greater will be the difference between the focus length of the optical device and the distance between the latter and the periphery of the deflected roll, and the more intense the generated signal will be, so that the magnitude of the counter stress produced by the hydraulic cylinders will be according to the intensity of the signal.

The advantage obtained by the arrangement according to this invention lies therein that in shaving skins, the product can be finished accurately within a tolerance of about ±1/10 mm.

In the following, the invention is described on hand of two examples shown in the accompanying drawings, in which FIG. 1 is a schematic view of a shaving machine with an optical scanning device and manual counter stress control;

FIG. 2 is a schematic view of a shaving machine with an optical scanning device and fully automatic counter stress control; and FIG. 3 is a schematic sectional view of the optical scanning device in relation to an associated roll.

FIG. 1 shows the simplest embodiment of a machine according to this invention, in which the optical scanning result is manually translated into adjustment of the counter stress. The shaving roll 1 is by a shaft 2 supported in bearings 3 and 4, and in similar manner, the counter roll 5 is by a shaft 6 supported in bearings 7, 8. Facing the counter roll 5 is the optical device 9 which lies in the plane in which the rolls 1 and 5 lie with their axes, and which is connected to any suitable indicating device 10 that is capable of generating, for example, an optical, an acoustic or an electrical output signal. If the counter stress control is manual, the optical indication by the device 10 is very useful in that it indicates to an attendant the approximate extent of operational deflection of the roll 5 on this device. Depending on the deflection indication by the device 10, the attendant will operate a pressure regulating valve 11 which through pipes 12, 13 is connected with hydraulic cylinders 14 that actuate the stress bearings 15, 16 and 17, 18 arranged on the shafts 2 and 6 of the rollers 1 and 5 at a distance from the adjacent primary bearings 7, 8 and 3, 4. While these primary bearings 3, 4 and 7, 8 are fixed, the respective shafts 2 and 6 therein have sufficient freedom to transmit bending stresses from the stress bearings to the shaft lengths between the primary bearings in order to counter and cancel operational bending deflection in these shaft lengths.

In the case of the fully automatic control (FIG. 2), which is the preferred embodiment of this invention, signals generated by the optical device 9, which in this instance are electric output signals, are transmitted to a variable-gain amplifier 19 which supplies the amplified signals to a pressure-regulating valve 20. Valve 20 is connected with a hydraulic power unit 21 including a motor 22, and delivers hydraulic pressure, according to the value of the control signals, to the hydraulic cylinders 23 and 24 which actuate the stress bearings 25 and 26, as well as to the hydraulic cylinders 27 and 28 which actuate the stress bearings 29 and 30.

The optical device 9 is shown in FIG. 3 in its positional relation to the shaving roll 1 and the counter roll 5. Furthermore, FIG. 3 shows in exaggerated manner how due to operational deflection of the counter roll 5, i.e., deflection to the right, the distance between the device 9 and the adjacent periphery of the roll 5, compared with the focus length $f$, is shortened, whereby a corresponding signal is generated in the device 9. The optical device 9 can be of any known manner. It can also be substituted by a fluidic device or by a mechanical sensor, or by any other like device. Such devices are known per se and form no part of this invention.

What is claimed is:

1. Shaving machine for hides, comprising companion shaving and counter rolls; spaced support bearings for said rolls, with said rolls tending to yield in operational bending deflection to a hide passing between them; stress bearings for said rolls spaced from said support bearings and hydraulically operable to apply to said rolls variable bending stresses to counter operational bending deflection of said rolls; a scanning device located in relation to one of said rolls to indicate the amount of operational deflection of the latter under a load from its non-deflected condition; and mechanism associated with said scanning device for automatically controlling operation of said stress bearings to counter operational bending deflection of said rolls according to the deflection indication by said device.

2. Shaving machine as in claim 1, in which said mechanism provides a variable-gain amplifier for amplifying deflection-indicating electric signals from said device, a pressure-regulation valve controlled by output signals from said amplifier, and hydraulic cylinders operating said stress bearings and supplied with hydraulic pressure from said valve, and a hydraulic power unit supplying said valve with hydraulic pressure.

3. Shaving machine as in claim 2, in which said scanning device is an optical device focused on said one roll in non-deflected condition.

* * * * *